US009120521B2

(12) United States Patent
Maeda et al.

(10) Patent No.: US 9,120,521 B2
(45) Date of Patent: Sep. 1, 2015

(54) FRONT COWL STRUCTURE FOR SADDLE RIDING TYPE VEHICLE (71) Applicant: HONDA MOTOR CO., LTD., Tokyo (JP)

(72) Inventors: Rui Maeda, Wako (JP); Yoshinori Korogi, Wako (JP); Shinsuke Yuki, Wako (JP); Atsushi Takasaki, Wako (JP); Shunji Yokokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 14/037,769

(22) Filed: Sep. 26, 2013

(65) Prior Publication Data
US 2014/0092613 A1   Apr. 3, 2014

(30) Foreign Application Priority Data

Sep. 28, 2012 (JP) ................................. 2012-217663

(51) Int. Cl.
B62J 17/02 (2006.01)
B62J 6/02 (2006.01)
F02M 35/16 (2006.01)
F02M 35/10 (2006.01)

(52) U.S. Cl.
CPC .. *B62J 17/02* (2013.01); *B62J 6/02* (2013.01); *F02M 35/10013* (2013.01); *F02M 35/162* (2013.01)

(58) Field of Classification Search
CPC ............ B62J 7/02; B62J 6/02; F02M 35/162; F02M 35/10013

USPC ......................... 296/181, 78.1; 180/68.3, 219
See application file for complete search history.

(56) References Cited

U.S. PATENT DOCUMENTS 4,457,552 A * 7/1984 Katsuoka ..................... 296/78.1
7,674,023 B2 * 3/2010 Ohira ............................ 362/475

FOREIGN PATENT DOCUMENTS

| EP | 2 206 911 A1 | 7/2010 |
| JP | 11-208554 A | 8/1999 |
| JP | 2010-149806 A | 7/2010 |

* cited by examiner

*Primary Examiner* — Pinel Romain
(74) *Attorney, Agent, or Firm* — Birch, Stewart, Kolasch & Birch, LLP (57) ABSTRACT A front cowl structure for a saddle riding type vehicle for preventing turbulence in a stream of air flowing over a front cowl surface. The front cowl structure includes a duct placed inside a front cowl with a duct opening that opens to the front of the vehicle. The front cowl has a cowl front surface opening at a leading end portion thereof for opening a cowl front surface. Headlights are disposed on both lateral sides of the cowl front surface opening with each having a lens surface. The lens surfaces form opening edge portions on both lateral sides of the cowl front surface opening. The lens surfaces are each inclined to a vehicle outer side and rearwardly from the opening edge portions. The duct opening and a cowl opening central portion of the cowl front surface opening are substantially aligned with each other in a vehicle longitudinal direction.

15 Claims, 8 Drawing Sheets

FRONT COWL STRUCTURE FOR SADDLE RIDING TYPE VEHICLE

CROSS-REFERENCE TO RELATED APPLICATIONS

The present application claims priority under 35 USC 119 to Japanese Patent Application No. 2012-217663 filed Sep. 28, 2012 the entire contents of which are hereby incorporated by reference.

BACKGROUND OF THE INVENTION

1. Field of the Invention

The present invention relates generally to front cowl structures for saddle riding type vehicles. More specifically, to a front cowl structure for a saddle riding type vehicle including a front cowl having an intake opening.

2. Description of Background Art

A saddle riding type vehicle is disclosed, for example, in Japanese Patent Laid-Open No. 2010-149806. This saddle riding type vehicle includes a duct portion of an air cleaner, the duct portion opening forwardly in the vehicle with an air introducing opening formed forwardly of a front cowl corresponding to the open duct portion. This arrangement is designed to supply an airflow from the vehicle forward direction to an intake system for improved air-intake efficiency.

The structure disclosed in Japanese Patent Laid-Open No. 2010-149806, however, includes a duct portion that is inclined upwardly toward the rear of the vehicle. The airflow supplied to the duct portion is thus slightly bent and the structure is not properly designed to make the most of air pressure of the airflow.

In the structure having the air introducing opening forwardly of the front cowl, as in Japanese Patent Laid-Open No. 2010-149806, turbulence is more likely to occur in a stream of air flowing over a front cowl surface, causing the airflow blowing against a rider to be disrupted, thus degrading ride comfort.

During high speed riding, a stick phenomenon of the stream of air flowing in the air introducing opening creates a greater resistance acting on an operation of tilting the vehicle to the left or right.

SUMMARY AND OBJECTS OF THE INVENTION

The present invention has been made in view of the foregoing situation. It is an object of an embodiment of the present invention to provide a front cowl structure for a saddle riding type vehicle, capable of making the most of air pressure of an airflow than ever before to prevent turbulence in a stream of air flowing over a front cowl surface even with a structure having an air introducing opening forwardly of the front cowl. Thus, a stick phenomenon of the stream of air flowing in the air introducing opening is contained.

To achieve the foregoing object, according to an embodiment of the present invention, a front cowl structure for a saddle riding type vehicle, includes a front cowl for covering a vehicle leading end portion and a duct disposed on an inside of the front cowl. The duct is provided for drawing in air for use in an intake system that supplies an engine with air, wherein the duct has a duct opening that opens forwardly of the vehicle. The front cowl has a cowl front surface opening at a leading end portion thereof. The cowl front surface provides an opening for a cowl front surface. Headlights are disposed on both lateral sides of the cowl front surface opening each have a lens surface. The lens surface forms an opening edge portion on a corresponding lateral side of the cowl front surface opening and is inclined to a vehicle outer side and rearwardly from the opening edge portion. The duct opening is formed to be substantially aligned with a cowl opening central portion of the cowl front surface opening in a vehicle longitudinal direction.

According to an embodiment of the present invention, the cowl front surface opening is formed to be larger than the duct opening so that all opening edge portions of the duct opening are visible as viewed from a vehicle forward side.

According to an embodiment of the present invention, the cowl front surface opening has a shouldered portion such that an entrance side wall of an opening entrance portion on the vehicle forward side has an opening width that is narrower than an opening width of a communicating path side wall of a communicating path that communicates with the duct opening.

According to an embodiment of the present invention, the cowl front surface opening is formed substantially into an M-shape including pairs of left and right taper edge portions that extend to taper toward a rear of the front cowl, and a boundary line portion between a cowl upper surface center portion. A cowl upper surface side portion on either lateral side of the front cowl is formed to be joined to the taper edge portions.

According to an embodiment of the present invention, the boundary line portion between the cowl upper surface center portion and the cowl upper surface side portion is formed into a recess that extends from a merging vertex of the taper edge portions rearwardly of the front cowl.

According to an embodiment of the present invention, the lens surface is inclined such that an entire surface thereof faces downwardly and rearwardly of the vehicle.

According to an embodiment of the present invention, the duct opening that opens forwardly of the vehicle is formed to be substantially aligned in the vehicle longitudinal direction with the cowl opening central portion of the cowl front surface opening that opens the cowl front surface at the leading end portion of the front cowl. A stream of air entering the duct opening while the vehicle is being operated can have part of the flow at the highest speed disposed at the central portion of the duct opening without being affected by the vehicle body shape, so that ram pressure of the stream of air flowing in the duct can be maximized to thereby achieve an effective drawing of air. In addition, the headlights disposed on both lateral sides of the cowl front surface opening each has a lens surface, the lens surface forming an opening edge portion on a corresponding lateral side of the cowl front surface opening and being inclined to the vehicle outer side and rearwardly from the opening edge portion. No step is thus formed of a connection between the headlight on either lateral side of the cowl front surface opening and the front cowl. Turbulence in the airflow does not therefore occur at the opening edge portions and the airflow that flows into the duct can be drawn as a laminar flow.

According to an embodiment of the present invention, the cowl front surface opening is formed such that all opening edge portions of the duct opening are visible as viewed from the vehicle forward side. No obstacles are formed that block inflow of air exist in an area forward of the duct opening. Thus, a smooth inflow of air and effective drawing of air is provided.

According to an embodiment of the present invention, the cowl front surface opening has a shouldered portion such that the entrance side wall of the opening entrance portion on the vehicle forward side has an opening width that is narrower than an opening width of the communicating path side wall of the communicating path that communicates with the duct opening. The shouldered portion can separate the stream of air flowing into the cowl front surface opening from the communicating path side wall, thus avoiding sticking of the stream of air onto the communicating path side wall. Thus, vehicle turning performance can thereby be improved.

According to an embodiment of the present invention, the cowl front surface opening is formed substantially into an M-shape including the pairs of left and right taper edge portions that extend to taper toward the rear of the front cowl. Thus, the boundary line portion between the cowl upper surface center portion and the cowl upper surface side portion on either lateral side of the front cowl is formed to be joined to the taper edge portions. A stream of air flowing from the opening edge portion of the cowl front surface opening to a cowl outer surface can thus be guided along the taper edge portions to flow along the cowl outer surface profile. This creates a stream of air flowing along the profile of the upper surface of the front cowl to thereby contain turbulence in the stream of air. Thus, a smooth airflow flowing over the upper surface of the front cowl is provided. As a result, the airflow flowing over the upper surface of the front cowl is smooth to provide a gentle airflow that blows against the rider.

According to an embodiment of the present invention, the boundary line portion between the cowl upper surface center portion and the cowl upper surface side portion is formed into a recess that extends from the merging vertex of the taper edge portions rearwardly of the front cowl. A turbulent flow produced at the opening edge portion of the cowl front surface opening can thus be made to flow from the merging vertex of the taper edge portions through the inside of the boundary line portion having a recessed shape to the rear of the front cowl. A laminar flow portion and a turbulent flow portion on both lateral sides of the cowl can thereby be properly isolated from each other, so that an adverse effect from the turbulent flow on the laminar flow can be minimized and the laminar flow can be maintained to minimize operating resistance.

According to an embodiment of the present invention, the lens surface is inclined such that the entire surface thereof faces downwardly and rearwardly of the vehicle. Even when the lens surface is made large, the foregoing aspect of the present invention allows a lens area to be held small and a front cowl area to be large when viewed from the front side. Airflow smoothing action by the front cowl can therefore be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A specific embodiment to which the present invention is applied will be described below.

A saddle riding type vehicle, such as a motorcycle, according to an embodiment of the present invention will be described in detail below with reference to FIGS. 1 to 8.

The drawings should be viewed in the direction of the reference numerals. The drawings show arrows to indicate directions relative to an operating direction of the motorcycle, an arrow Fr denoting a vehicle forward direction, an arrow Rr denoting a vehicle rearward direction, an arrow Up denoting a vehicle upward direction, and an arrow Dw denoting a vehicle downward direction, respectively.

Figure 1:
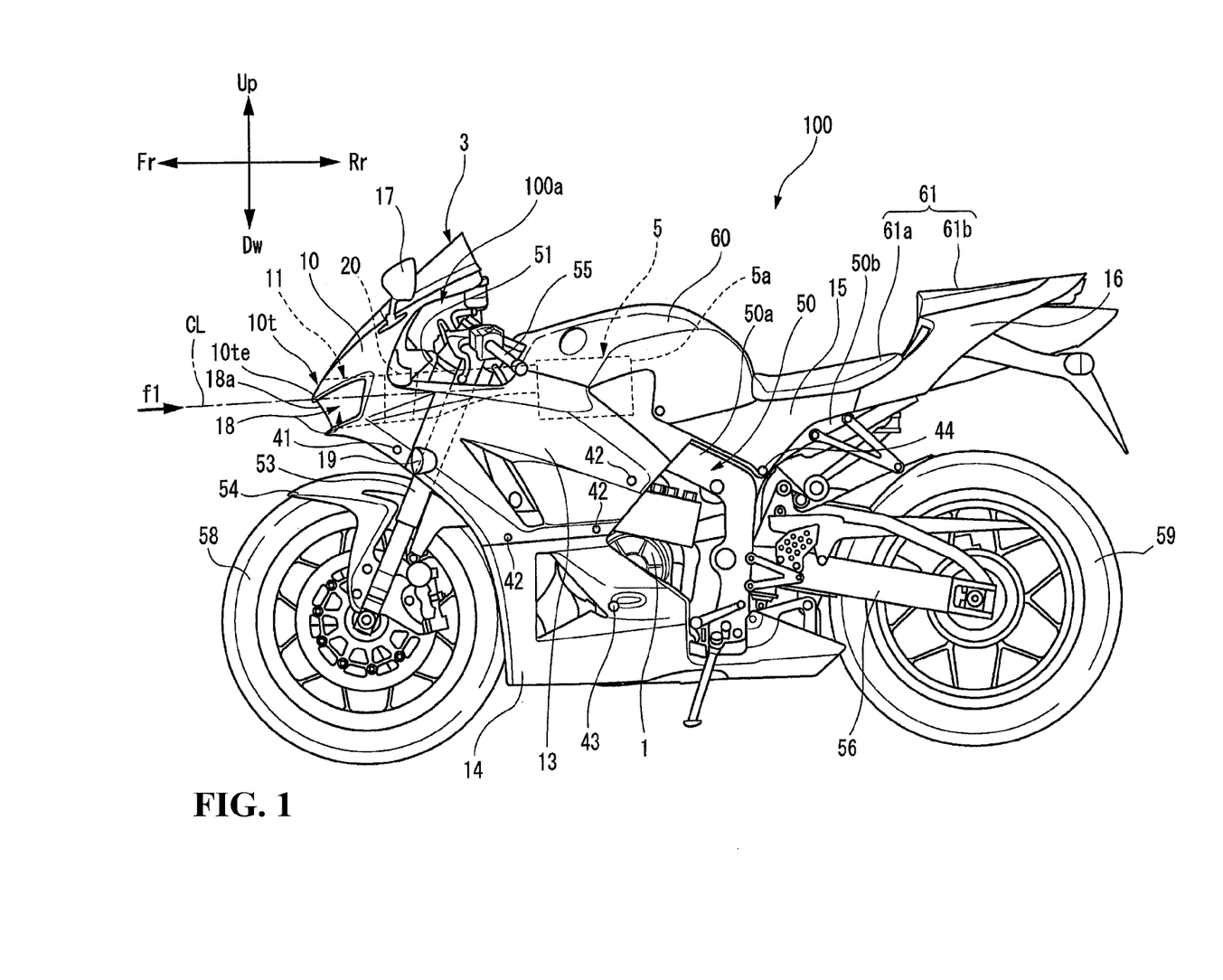
FIG. 1 is a left side elevational view showing a motorcycle according to an embodiment of the present invention.

FIG. 1 is a side elevational view showing a motorcycle 100 according to an embodiment of the present invention.

The motorcycle 100 includes a vehicle body frame 50 having a framework on which various component parts are attached. The vehicle body frame 50 includes a head pipe 51 disposed at a vehicle front end portion and a pair of left and right main frames 50a that branch laterally from the head pipe 51 and extend obliquely downwardly toward the rear. An engine 1 is held on a lower side of the main frames 50a as appropriate. A front fork 53 that supports a front wheel 58 is steerably supported on the head pipe 51. A steering handlebar 55 is connected to an upper portion of the front fork 53.

A rear fork 56 that supports a rear wheel 59 is vertically swingably supported on the vehicle body frame 50. The rear fork 56 is suspended as appropriate on the main frames 50a via suspension means.

A fuel tank 60 is disposed at an upper portion of the main frames 50a of the vehicle body frame 50. A riding seat 61 including a rider's seat 61a and a passenger's seat 61b is disposed at a rear portion of the vehicle body frame 50.

A pair of left and right seat rails 50b is disposed rearwardly of the vehicle body frame 50 extending obliquely upwardly from a rear end portion of the main frames 50a to the rear. The riding seat 61, for example, is held on the seat rails 50b.

The motorcycle 100 according to the first embodiment of the present invention has an outside covered in a vehicle body cover 3 as appropriate. More specifically, the vehicle body cover 3 covers vehicle component parts and electrical parts as appropriate and includes, for example, a front cowl 10, a side cowl 13, a bottom cowl 14, a seat lower cover 15 and a rear cover 16. The front cowl 10 covers a vehicle front portion side as a vehicle leading end portion 100a. The side cowl 13 covers parts extending from an upper portion side surface side of the engine 1 to a downward side of the fuel tank 60 at an area rearwardly of the front cowl 10. The bottom cowl 14 covers a downward side of the engine 1. The seat lower cover 15 covers parts extending from a rearward side of the side cowl 13 to a downward side of the rider's seat 61a. The rear cover 16 covers a lower side of the passenger's seat 61b at an area rearward of the seat lower cover 15. It is noted that the vehicle body cover 3 is substantially symmetrical in shape on both sides of the vehicle for covering the vehicle body.

The front cowl 10, the side cowl 13, the bottom cowl 14, the seat lower cover 15, and the rear cover 16 are fixed to the vehicle body via, for example, mounting screws 41, 42, 43 and 44, as appropriate.

In the embodiment of the present invention, a pair of left and right headlights 18, 18 is disposed at a leading end portion 10t of the front cowl 10. The headlights 18, 18 are each formed into a horizontally long, substantially rectangular shape extending from a front surface side of the front cowl 10 to a corresponding lateral surface, so that a lens surface 18a is formed into an outer surface shape extending substantially along a cowl outer surface. The headlights 18, 18 are thus formed so that air flows smoothly along the lens surfaces 18a, 18a while the vehicle is being operated. The front cowl 10 has a cowl front surface opening 11 to be described later (see FIG. 2) formed between the left and right headlights 18, 18.

Figure 2:
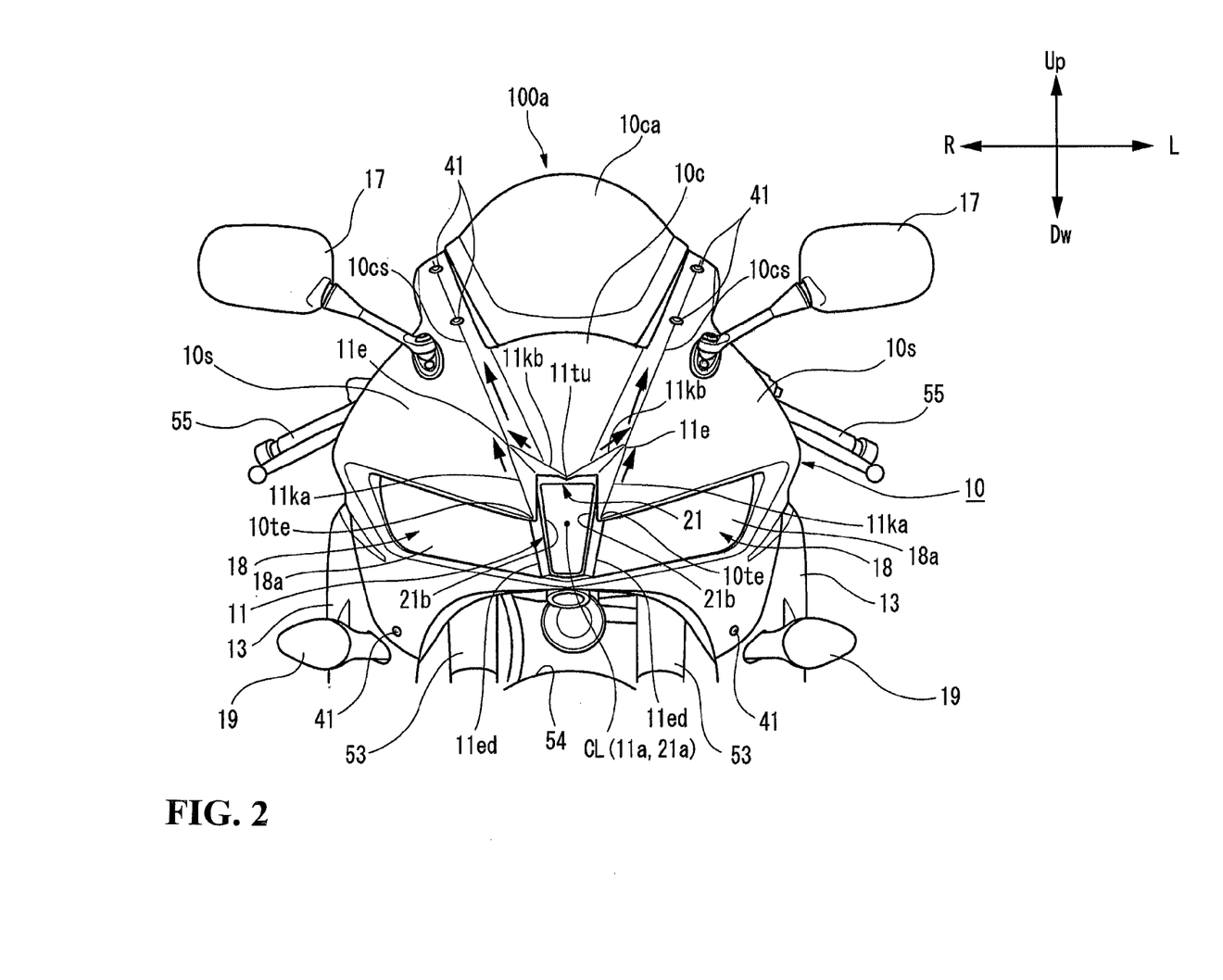
FIG. 2 is a front elevational view showing a front cowl in the motorcycle shown in FIG. 1.

As shown in FIG. 2, the front cowl 10 and the side cowl 13 generally cover, on a side upward of a front fender 54, parts other than a rearview mirror 17, a direction indicator 19, and the handlebar 55 that are members protruding in a vehicle width direction. The front cowl 10 and the side cowl 13 are designed to achieve smooth streams of air along the upper and side portions of the vehicle. The front cowl 10, in particular, uses an airflow to generate a down force as appropriate, thereby contributing to steady vehicle operation.

In the embodiment of the present invention, an air cleaner case 5a (see FIG. 1) of an intake system 5 is disposed at a position upward of the engine 1 and beneath the fuel tank 60. A duct 20 (see FIG. 1) that extends toward a vehicle front portion is connected to the air cleaner case 5a. The duct 20 has a duct opening 21 that opens toward the front of the vehicle. The cowl front surface opening 11 that is an opening in the front surface of the front cowl 10 is disposed on a forward side of the duct opening 21. An air stream path free of protrusions to obstruct an inflow of air is formed between the cowl front surface opening 11 and the duct 20. Thus, air forward of the vehicle is supplied from the cowl front surface opening 11 in the cowl front surface to the air cleaner case 5a via the duct 20.

Though portions of the intake system 5 close to the engine 1 are not shown, the air cleaner case 5a is connected as appropriate to a throttle body (not shown) connected to an intake port of the engine 1. The air cleaner case 5a has a filter element (not shown) disposed thereinside. A clean air chamber downstream in the stream of air of the filter element is connected to the throttle body and the duct 20 is connected to an upstream side in the stream of air of the filter element.

The throttle body includes an injector and a throttle valve disposed therein, the injector injecting fuel and the throttle valve being oscillatable and regulating an intake air amount. Air supplied through the duct 20 is mixed with fuel in the throttle body and supplied as a mixture of gas to the intake port of the engine 1.

Figure 3:
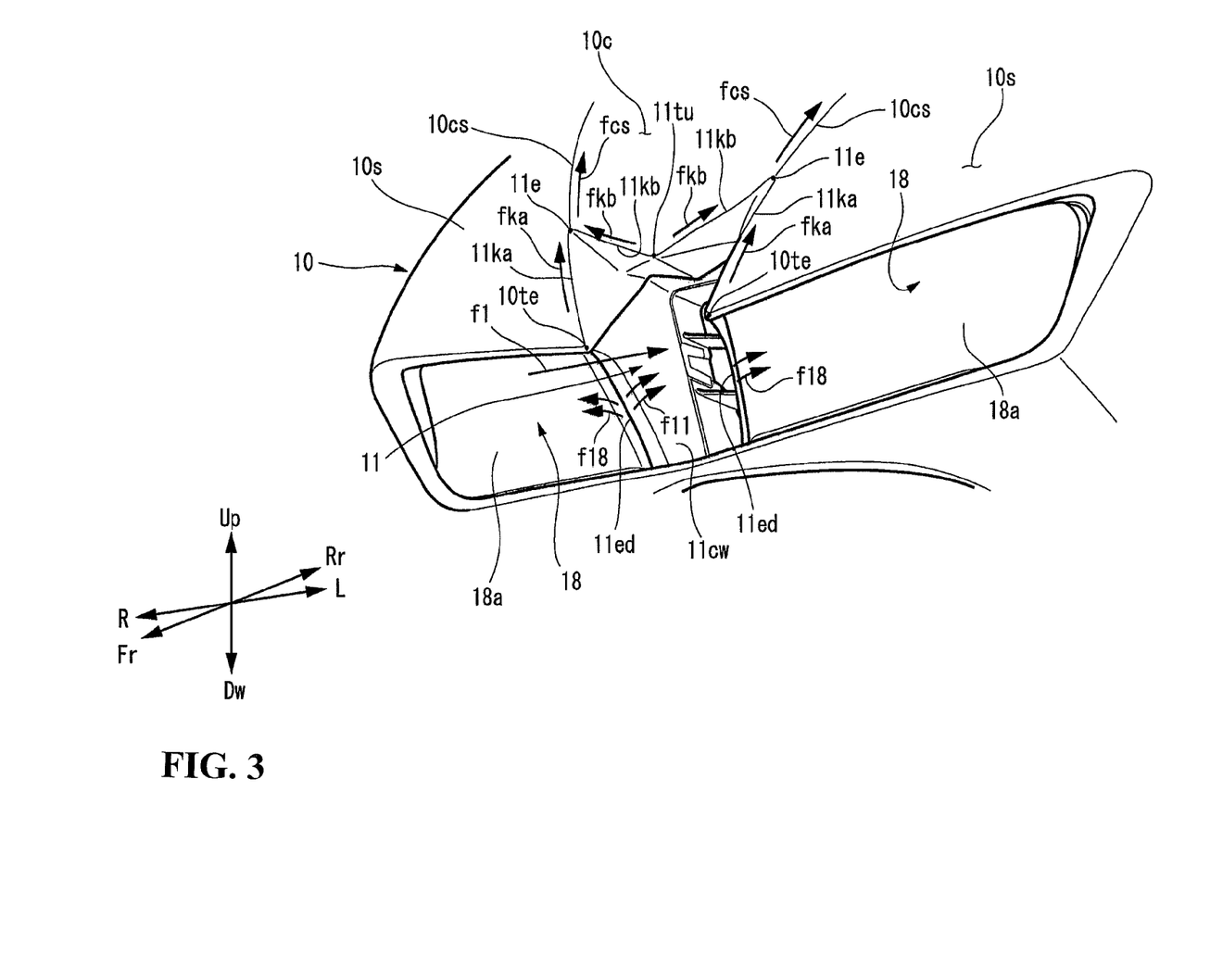
FIG. 3 is a perspective view showing the front cowl in the motorcycle shown in FIG. 1.

As shown in FIGS. 2 and 3, in the embodiment of the present invention, the cowl front surface opening 11 is disposed between the headlights 18, 18 at a frontmost end of the front cowl 10 that covers the vehicle leading end portion 100a. The cowl front surface opening 11 is formed such that a center thereof in a vehicle height direction is on a level substantially equal to a height of extreme leading end portions 10te, 10te (at two places on both lateral sides of the cowl front surface opening 11) of the front cowl 10. The cowl front surface opening 11 is disposed relative to the extreme leading end portions 10te, 10te as follows. More specifically, referring to FIG. 1, when the motorcycle 100 is viewed from a side, the cowl front surface opening 11 is formed to extend over a range that expands vertically in upper and lower directions from and about the extreme leading end portion 10te. When viewed from a vehicle forward direction, the cowl front surface opening 11 is formed between the extreme leading end portions 10te, 10te and between the headlights 18, 18.

The headlights 18, 18 disposed on both sides of the cowl front surface opening 11 each have the lens surface 18a. The lens surfaces 18a, 18a form opening edge portions 11ed, 11ed on both lateral sides of the cowl front surface opening 11. In addition, the lens surfaces 18a, 18a are each inclined to a vehicle outer side and rearwardly from the opening edge portions 11ed, 11ed. The lens surfaces 18a, 18a of the headlights 18, 18 disposed on both sides of the cowl front surface opening 11, are formed into smooth edge shapes as the opening edge portions 11ed, 11ed on both sides of the cowl front surface opening 11 as described above, to prevent turbulence of the airflow from the vehicle forward direction from occurring when the airflow is divided into a lens surface side wind f18 and an opening inside side wind f11. This allows the airflow that flows into the cowl front surface opening 11 to be drawn as a laminar flow.

In addition, in the embodiment of the present invention, the lens surface 18a of the headlight 18 is inclined such that an entire surface thereof faces downwardly as shown in FIG. 1. The lens surface 18a is inclined so as to have the entire surface not only facing downwardly, but also extending rearwardly to follow along a cowl outer surface toward a corresponding lateral outer side in the vehicle lateral direction as shown in FIGS. 2 and 3.

As described above, the lens surface 18a is inclined so as to have the entire surface facing downwardly and rearwardly. Even when the lens surface is made large, the foregoing arrangement allows a lens area to be held small and a front cowl area to be large when viewed from the front side. As a result, a greater amount of air can be blown against the front cowl 10, so that the front cowl 10 can achieve enhanced laminar flow adjusting the ability of the airflow.

Referring to FIGS. 2 and 3, shapes of the cowl front surface opening 11 and its surrounding parts according to the embodiment of the present invention will be described below.

As shown in FIGS. 2 and 3, the front cowl 10 includes a cowl upper surface center portion 10c at the center of the cowl upper surface and cowl upper surface side portions 10s, 10s on both lateral sides of the cowl upper surface center portion 10c. More specifically, the cowl upper surface center portion 10c is formed into a curved surface that is joined to taper edge portions 11kb, 11kb that assume upper edge portions of the cowl front surface opening 11. The cowl upper surface side portions 10s, 10s are formed into curved surfaces that are joined to taper edge portions 11ka, 11ka that assume side edge portions of the cowl front surface opening 11.

Thus, boundary line portions 10cs, 10cs between the cowl upper surface center portion 10c and the cowl upper surface side portions 10s, 10s are each formed into a recessed line at which different curved surfaces merge. Additionally, the cowl front surface opening 11 formed substantially into an M-shape is formed such that the boundary line portions 10cs, 10cs extend rearwardly from merging vertices 11e, 11e of the pairs of left and right taper edge portions 11ka and 11kb toward the rear of the front cowl.

As described above, the cowl front surface opening 11 has an upper half portion shaped substantially into an M-shape, the merging vertices 11e, 11e are formed so as to overlap the boundary line portions 10cs, 10cs, and the boundary line portions 10cs, 10cs are formed to extend rearwardly of the cowl. Therefore, guiding winds fka and fkb can be produced at the edge portions of the upper half portion of the cowl front surface opening 11, the guiding winds fka and fkb guiding to the merging vertices 11e, 11e disturbed airflows that occur when the airflow is divided into one flowing into the opening and one flowing onto the outside of the opening, and the guiding winds fka and fkb are made to flow rearwardly of the front cowl as boundary line winds fcs that flow through the boundary line portions 10cs, 10cs having a recessed shape. As a result, a laminar flow portion and a turbulent flow portion on both lateral sides of the front cowl can be properly isolated from each other, so that an adverse effect from the turbulent flow on the laminar flow can be minimized and a steady stream of air can be produced so that the stream of air flows to follow the shape of the upper surface of the front cowl 10.

Turbulence in the stream of air is contained and the airflow flowing over the upper surface of the front cowl 10 is smoothed as described above. The airflow flowing over the upper surface of the front cowl 10 and blowing against the rider can thus be turned to a gentle airflow.

A structure of the duct 20 according to the embodiment of the present invention will be described.

Figure 4:
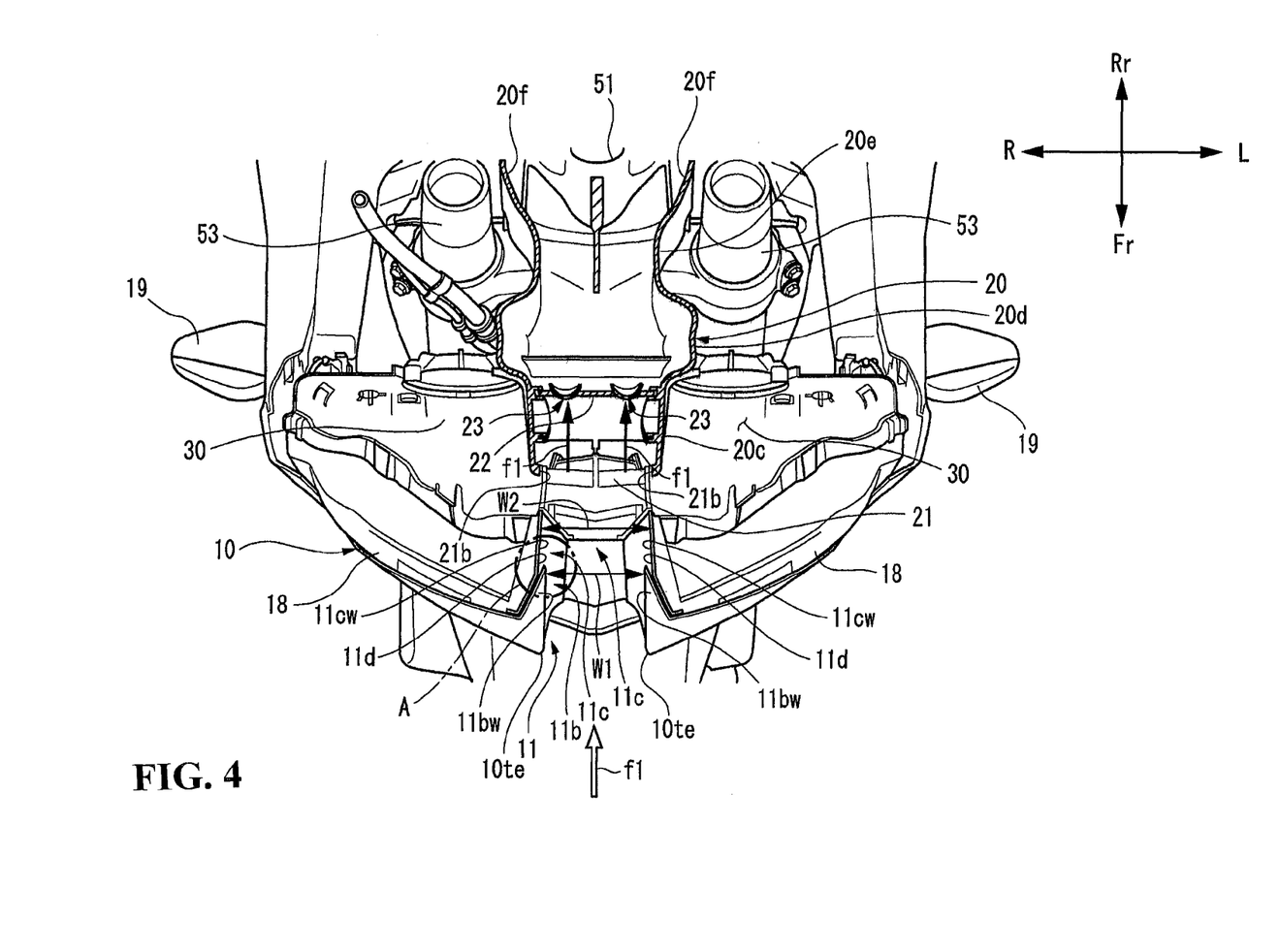
FIG. 4 is a horizontal cross-sectional view schematically showing a main section of a leading end portion, horizontally cut away, of the front cowl in the motorcycle shown in FIG. 1.
Figure 5:
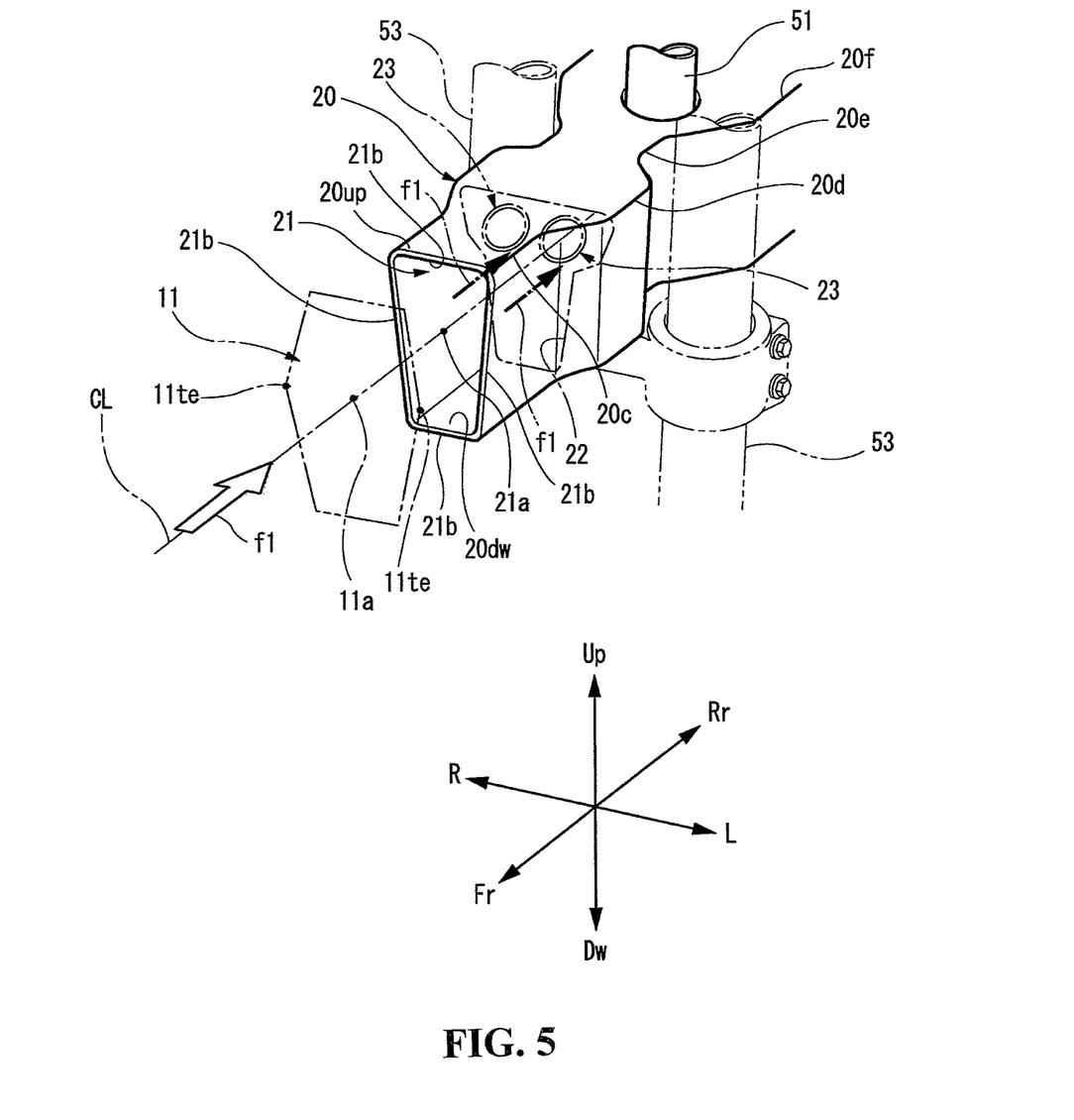
FIG. 5 is a perspective view schematically showing a main section of a duct disposed inside the front cowl in the motorcycle shown in FIG. 1.

As shown in FIGS. 4 and 5, the duct 20 has the duct opening 21 disposed rearwardly of, and corresponding to, the cowl front surface opening 11. The duct opening 21 has a rectangular shape in its transverse cross section and opens toward the front of the vehicle. As viewed from the front of the vehicle, the duct opening 21 is disposed such that a duct opening central portion 21a thereof is disposed between the extreme leading end portions 10te, 10te of the front cowl 10. More specifically, as shown in FIG. 5, the cowl front surface opening 11 has a cowl opening central portion 11a aligned with the duct opening central portion 21a in a vehicle longitudinal direction. This is translated, when viewed from a side of the vehicle (see FIG. 1), to the duct opening central portion 21a of the duct opening 21, the cowl opening central portion 11a of the cowl front surface opening 11, and the extreme leading end portions 10te, 10te of the front cowl 10 being disposed on a longitudinal axis CL.

Figure 6:
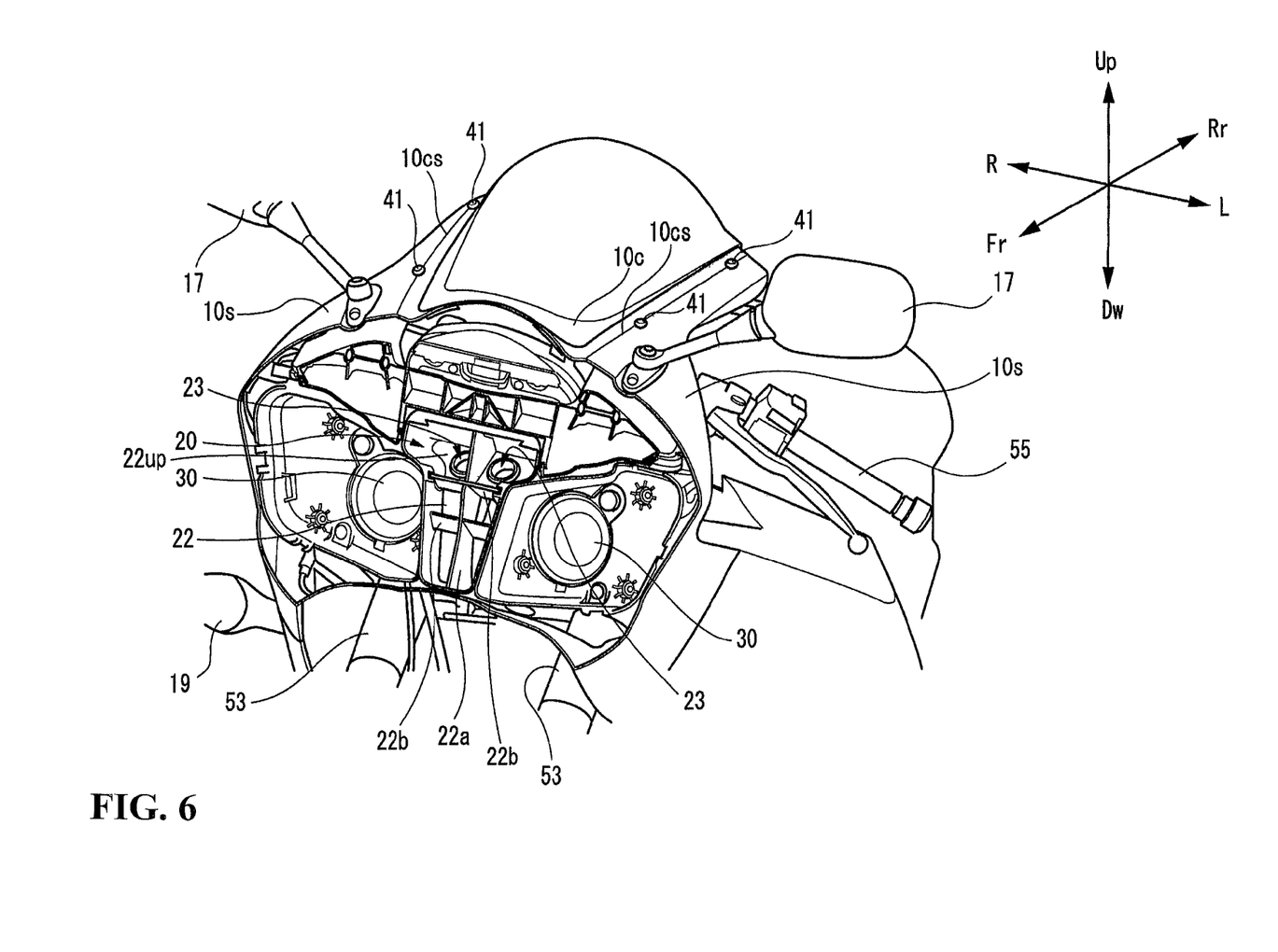
FIG. 6 is a vertical cross-sectional view schematically showing a main section of the leading end portion, vertically cut away, of the front cowl in the motorcycle shown in FIG. 1.

Referring to FIG. 6, a bulkhead 22 is disposed rearwardly of the duct opening 21. The bulkhead 22 has a pair of circular communicating holes 23, 23 arrayed laterally. In addition, the bulkhead 22 has, for example, a vertical rib 22a that extends vertically and is disposed at a lateral center and a plurality of horizontal ribs 22b that extend laterally. The strength of the bulkhead 22 is thus reinforced.

In the embodiment of the present invention, the duct 20 includes a leading end portion 20c, an enlarged-diameter portion 20d, a constricted portion 20e, and a branching portion 20f connected in a row to each other in the vehicle longitudinal direction and substantially horizontally. More specifically, the leading end portion 20c having the duct opening 21 is formed, for example, into a rectangle in its transverse cross section having a bottom side wall 20dw slightly shorter in length than an upper side wall 20up as shown in FIG. 5. The leading end portion 20c is shaped so as to substantially correspond to an opening shape of the cowl front surface opening 11. The enlarged-diameter portion 20d disposed rearwardly of the leading end portion 20c is shaped to be larger in the lateral direction than the leading end portion 20c. The bulkhead 22 is disposed inside the enlarged-diameter portion 20d. The constricted portion 20e is disposed rearwardly of the enlarged-diameter portion 20d between the left and right front forks 53, 53. The branching portion 20f is formed as a flow path that extends rearwardly from the constricted portion 20e and branches laterally so as to sandwich the head pipe 51.

Referring to FIGS. 4 and 6, light source mounting portions 30 of the headlights 18, 18 are formed on both lateral sides of the leading end portion 20c of the duct 20.

The duct opening central portion 21a of the duct opening 21 is aligned with the cowl opening central portion 11a of the cowl front surface opening 11 in the front cowl 10 in the vehicle longitudinal direction as described earlier. A stream of air f1 entering the duct opening 21 while the vehicle is being operated can thus further flow without being affected by the vehicle body shape as shown in FIGS. 4 and 5. Thus, the stream of air f1 is able to enter directly the duct opening 21 as a stream of air with the highest speed. Consequently, ram pressure of the stream of air f1 flowing in the duct 20 can be maximized to thereby enable an effective supply of air through the duct opening 21.

The bulkhead 22 in the embodiment of the present invention is, for example, inclined so that a front surface of an upper side portion 22up thereof faces forwardly and upwardly as shown in FIG. 6. The upper side portion 22up includes the communicating holes 23, 23.

The bulkhead 22 disposed in the duct 20 can, for example, prevent rainwater that has entered the cowl front surface opening 11 from reaching far into the duct 20. In addition, the communicating holes 23, 23 are open slightly upwardly.

The cowl front surface opening 11 is formed such that all opening edge portions 21b of the duct opening 21 are visible as viewed from the front of the vehicle (see FIG. 2). More specifically, the cowl front surface opening 11 is formed forwardly of the duct opening 21 so as to be free from any portions obstructing the duct opening 21.

As described above, the cowl front surface opening 11 is formed such that all opening edge portions 21b of the duct opening 21 are visible as viewed from the front of the vehicle and so as to be free from any portions obstructing the duct opening 21 forwardly thereof. An extremely smooth inflow of air into the duct opening 21 can therefore be achieved, thus enabling the supply of air that is effective in increasing the ram pressure.

As shown in FIG. 4, an entrance side wall 11bw of an opening entrance portion 11b on the vehicle forward side has an opening width W1 that is narrower than an opening width W2 of a communicating path side wall 11cw of a communicating path 11c. In addition, referring to FIG. 7, a shouldered portion 11d having a shoulder width W3 is formed between the entrance side wall 11bw and the communicating path side wall 11cw at an upper portion of the cowl front surface opening 11.

An effect of the shouldered portion 11d will be described in detail below with reference to FIGS. 7 and 8.

In the cowl front surface opening 11 of the embodiment of the present invention, the opening width W1 of the entrance side wall 11bw at the opening entrance portion 11b on the vehicle forward side is narrower than the opening width W2 of the communicating path side wall 11cw. This forms the shouldered portion 11d that is wider on the inside having a shoulder width W3 between the entrance side wall 11bw on the forward side and the communicating path side wall 11cw on the rearward side.

Figure 7:
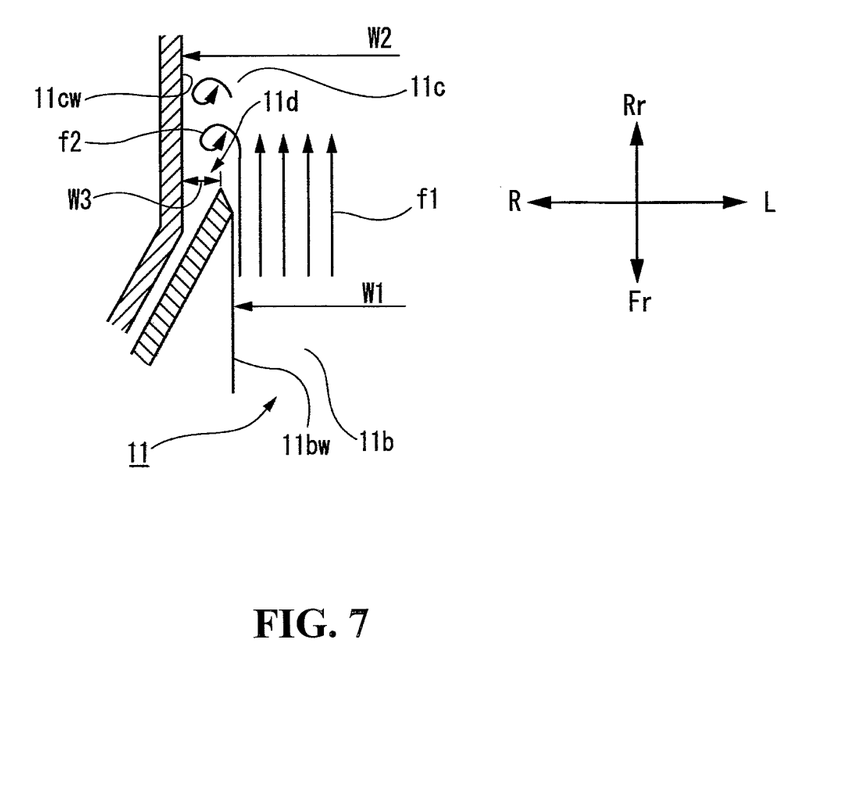
FIG. 7 is an enlarged cross-sectional view showing a main section of portion A of a cowl front surface opening shown in FIG. 4.

When the stream of air f1 enters the cowl front surface opening 11, part of the stream of air f1 close to the wall surface is pulled in the direction of the communicating path side walls 11cw on both lateral sides (FIG. 7 shows the right-hand side of the vehicle only) because of the shouldered portion 11d formed in the foregoing manner, thus forming a vortex flow 12. The formation of the vortex flow f2 causes the stream of air f1 to be separated from the left and right communicating path side walls 11cw, thus avoiding sticking of the stream of air f1 onto the communicating path side walls 11cw. The avoidance of the sticking of the stream of air f1 onto the communicating path side walls 11cw allows, for example, resistance to be minimized when the vehicle is to be operated to be leaned to the left or right, thus improving vehicle turning performance.

Figure 8:
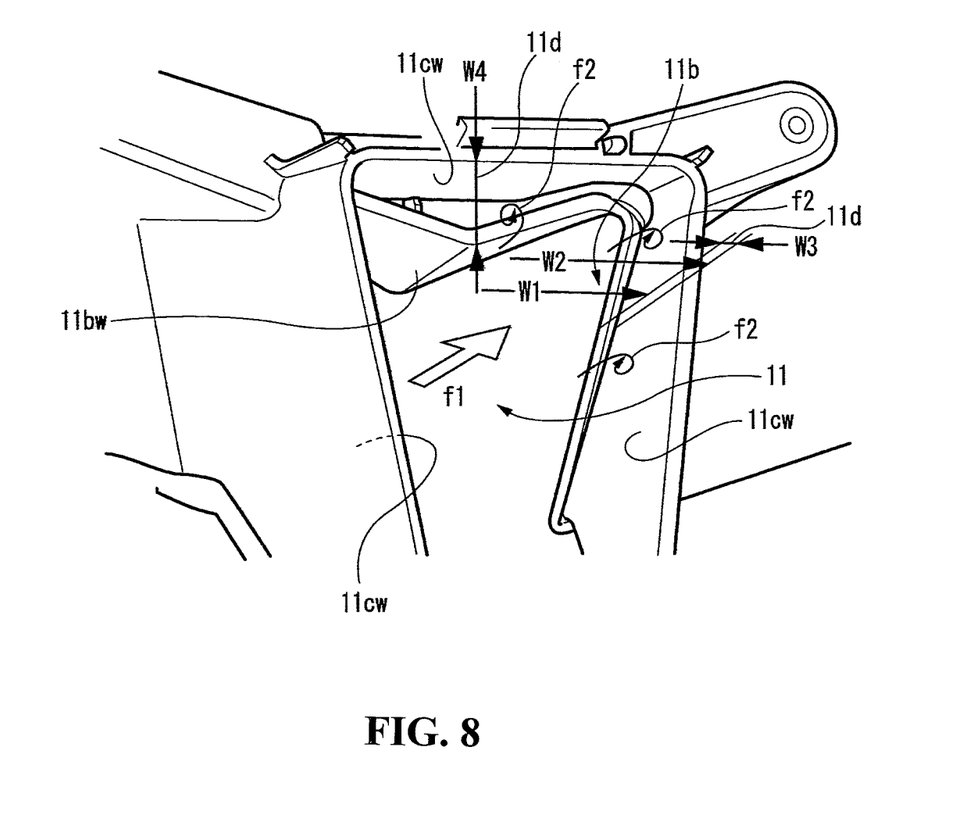
FIG. 8 is a perspective view of a main section showing a shape of an upward edge portion of the cowl front surface opening of the front cowl in the motorcycle shown in FIG. 1.

As shown in FIG. 8, in the embodiment of the present invention, the shouldered portion 11d is formed not only on both lateral sides of the cowl front surface opening 11, but also, for example, between the entrance side wall 11bw at the upper portion of the cowl front surface opening 11 and the communicating path side wall 11cw on the rearward side, at which the shoulder width W4 wider than those on both lateral sides is formed. Accordingly, the shouldered portion 11d is formed continuously on both lateral sides and the upper side of the cowl front surface opening 11.

In the embodiment of the present invention described heretofore, the duct opening 21 is formed into a rectangle. The duct opening 21 is not necessarily formed into a rectangle and may be formed into an elliptic or circular shape. In the above-described embodiment of the present invention, the bulkhead 22 has two communicating holes 23 as part of the structure of the duct 20. However, this is not the only possible arrangement.

The above-described embodiment of the present invention has been described for a case in which the present invention is applied to a motorcycle. The present invention is nonetheless applicable to saddle riding type vehicles of various other types.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A front cowl structure for a saddle riding vehicle, comprising:
    a front cowl for covering a vehicle leading end portion;
    a duct disposed on an inside of the front cowl, the duct for drawing in air for use in an intake system that supplies an engine with air, wherein:
    the duct has a duct opening that opens forwardly of the vehicle;
    the front cowl has a cowl front surface opening at a leading end portion thereof, the cowl front surface opening for opening a cowl front surface;
    headlights disposed on both lateral sides of the cowl front surface opening each including a lens surface, the lens surface forming an opening edge portion on a corresponding lateral side of the cowl front surface opening and being inclined to a vehicle outer side and rearwardly from the opening edge portion;
    said duct opening being formed to be substantially aligned with a cowl opening central portion of the cowl front surface opening in a vehicle longitudinal direction; and
    said lens surface being inclined such that an entire surface thereof faces downwardly and rearwardly of the vehicle.

2. The front cowl structure for a saddle riding vehicle according to claim 1, wherein the cowl front surface opening is formed to be larger than the duct opening so that all opening edge portions of the duct opening are visible as viewed from a vehicle forward side.

3. The front cowl structure for a saddle riding vehicle according to claim 1, wherein the cowl front surface opening has a shouldered portion wherein an entrance side wall of an opening entrance portion on the vehicle forward side has an opening width that is narrower than an opening width of a communicating path side wall of a communicating path that communicates with the duct opening.

4. The front cowl structure for a saddle riding vehicle according to claim 2, wherein the cowl front surface opening has a shouldered portion wherein an entrance side wall of an opening entrance portion on the vehicle forward side has an opening width that is narrower than an opening width of a communicating path side wall of a communicating path that communicates with the duct opening.

5. The front cowl structure for a saddle riding vehicle according to claim 1, wherein:
    the cowl front surface opening is formed substantially into a M-shape including pairs of left and right taper edge portions that extend to taper toward a rear of the front cowl; and
    a boundary line portion between a cowl upper surface center portion and a cowl upper surface side portion on either lateral side of the front cowl is formed to be joined to the taper edge portions.

6. The front cowl structure for a saddle riding vehicle according to claim 2, wherein:
    the cowl front surface opening is formed substantially into a M-shape including pairs of left and right taper edge portions that extend to taper toward a rear of the front cowl; and
    a boundary line portion between a cowl upper surface center portion and a cowl upper surface side portion on either lateral side of the front cowl is formed to be joined to the taper edge portions.

7. The front cowl structure for a saddle riding vehicle according to claim 3, wherein:
    the cowl front surface opening is formed substantially into a M-shape including pairs of left and right taper edge portions that extend to taper toward a rear of the front cowl; and
    a boundary line portion between a cowl upper surface center portion and a cowl upper surface side portion on either lateral side of the front cowl is formed to be joined to the taper edge portions.

8. The front cowl structure for a saddle riding vehicle according to claim 5, wherein the boundary line portion between the cowl upper surface center portion and the cowl upper surface side portion is formed into a recess that extends from a merging vertex of the taper edge portions rearwardly of the front cowl.

9. A front cowl structure for a saddle riding vehicle, comprising:
    a front cowl for covering a vehicle leading end portion;
    a duct disposed on an inside of the front cowl, said duct including a duct opening that opens forwardly of the vehicle;
    a cowl front surface opening at a leading end portion of the front cowl;
    headlights disposed on both lateral sides of the cowl front surface opening each including a lens surface, the lens surface forming an opening edge portion on a corresponding lateral side of the cowl front surface opening and being inclined to a vehicle outer side and rearwardly from the opening edge portion; and
    said duct opening being substantially aligned with a cowl opening central portion of the cowl front surface opening in a vehicle longitudinal direction.

10. The front cowl structure for a saddle riding vehicle according to claim 9, wherein the cowl front surface opening is formed to be larger than the duct opening so that all opening edge portions of the duct opening are visible as viewed from a vehicle forward side.

11. The front cowl structure for a saddle riding vehicle according to claim 9, wherein the cowl front surface opening has a shouldered portion wherein an entrance side wall of an opening entrance portion on the vehicle forward side has an opening width that is narrower than an opening width of a communicating path side wall of a communicating path that communicates with the duct opening.

12. The front cowl structure for a saddle riding vehicle according to claim 9, wherein:

the cowl front surface opening is formed substantially into a M-shape including pairs of left and right taper edge portions that extend to taper toward a rear of the front cowl; and a boundary line portion between a cowl upper surface center portion and a cowl upper surface side portion on either lateral side of the front cowl is formed to be joined to the taper edge portions.

13. The front cowl structure for a saddle riding vehicle according to claim 12, wherein the boundary line portion between the cowl upper surface center portion and the cowl upper surface side portion is formed into a recess that extends from a merging vertex of the taper edge portions rearwardly of the front cowl.

14. The front cowl structure for a saddle riding vehicle according to claim 9, wherein the lens surface is inclined such that an entire surface thereof faces downwardly and rearwardly of the vehicle.

15. The front cowl structure for a saddle riding vehicle according to claim 10, wherein the lens surface is inclined such that an entire surface thereof faces downwardly and rearwardly of the vehicle.

* * * * *